US006534556B2

(12) United States Patent
Lacarte et al.

(10) Patent No.: US 6,534,556 B2
(45) Date of Patent: Mar. 18, 2003

(54) SPRAYABLE AUTOFROTHING POLYISOCYANATE FOAM AND DELIVERY SYSTEM

(75) Inventors: Chris Lacarte, High River (CA); Greg Gardin, Cambridge (CA); Thomas Harris, Grosse Ile, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/789,234

(22) Filed: Feb. 20, 2001

(65) Prior Publication Data

US 2002/0198275 A1 Dec. 26, 2002

(51) Int. Cl.⁷ ............................................. C08G 18/48
(52) U.S. Cl. ............. 521/174; 252/182.24; 252/182.27; 521/131
(58) Field of Search ...................... 252/182.24, 182.27; 521/131, 174

(56) References Cited

U.S. PATENT DOCUMENTS

| | | | |
|---|---|---|---|
| 4,137,265 A | 1/1979 | Edwards et al. | |
| 4,500,655 A | 2/1985 | Brennan | 521/163 |
| 4,927,863 A | 5/1990 | Bartlett et al. | 521/131 |
| 4,972,003 A | 11/1990 | Grünbauer et al. | 521/131 |
| 4,997,706 A | 3/1991 | Smits et al. | 428/304.4 |
| 5,120,815 A | 6/1992 | Marugg et al. | 528/73 |
| 5,391,317 A | 2/1995 | Smits | 252/182.24 |
| 5,430,071 A | 7/1995 | Green et al. | 521/131 |
| 5,439,947 A | 8/1995 | Bartlett et al. | 521/131 |
| 5,447,964 A | 9/1995 | Green et al. | 521/131 |
| 5,449,699 A | 9/1995 | Green | 521/131 |
| 5,451,614 A | 9/1995 | Green et al. | 521/129 |
| 5,455,283 A | 10/1995 | Green et al. | 521/175 |
| 5,470,891 A | 11/1995 | Green et al. | 521/131 |
| 5,488,072 A | 1/1996 | Green | 521/129 |
| 5,514,724 A | 5/1996 | Green et al. | 521/78 |
| 5,516,811 A | 5/1996 | Bartlett et al. | 521/131 |
| 5,532,284 A | 7/1996 | Bartlett et al. | 521/134 |
| 5,872,156 A * | 2/1999 | Inazawa et al. | 521/128 |
| 5,874,021 A | 2/1999 | Inazawa et al. | 252/182.25 |
| 6,005,016 A | 12/1999 | Nodelman et al. | 521/164 |
| 6,281,393 B1 * | 8/2001 | Molina et al. | 544/401 |

* cited by examiner

Primary Examiner—John M. Cooney, Jr.
(74) Attorney, Agent, or Firm—Fernando A. Borrego

(57) ABSTRACT

A formulated resin composition for producing a closed cell rigid polyisocyanate based foam is disclosed. The formulated resin composition for use in a polyurethane froth spraying system includes a hydrofluorocarbon blowing agent, a Mannich polyol, at least one additional polyol, a catalyst system, and a surfactant. The formulated resin composition has a hydroxyl content of at least 400 mg KOH/g and a polyurethane foam produced utilizing the formulated resin composition has a closed cell content of at least 90 percent. The formulated resin composition exhibits a zero ozone depleting potential and produces a polyurethane foam that cures faster than conventional sprayed polyurethane foams.

29 Claims, No Drawings

SPRAYABLE AUTOFROTHING POLYISOCYANATE FOAM AND DELIVERY SYSTEM

FIELD OF THE INVENTION

The present invention pertains to dimensionally stable closed cell spray rigid polyisocyanate based foams, and more particularly to foaming reaction mixtures which froth at a spray dispensing head, employing as a blowing agent a hydrofluorocarbon. With more particularity, the invention pertains to dimensionally stable closed cell spray rigid polyisocyanate based foams which froth at a spray dispensing head and the polyol resin blends used to make such foams.

BACKGROUND OF THE INVENTION

Various hydrofluorocarbons (HFCS) have been investigated in the industry as blowing agents for polyisocyanate based foams due to their low or nonexistent ozone depletion potentials. It would be desirable to utilize a hydrofluorocarbon (HFC) blowing agent in a sprayable froth polyurethane system. Such a system would allow for production of an environmentally friendly closed cell polyurethane foam that exhibits improved cell structure and expands at a lower temperature range. It is also desirable to produce a polyurethane foam that avoids excessive creep and allows for improved dimensional stability.

SUMMARY OF THE INVENTION

The present invention provides a formulated resin composition for producing a closed cell rigid polyisocyanate based foam. In one embodiment the formulated resin composition for use in a polyurethane froth spraying system comprises: a hydrofluorocarbon blowing agent; a Mannich polyol; at least one additional polyol; a catalyst system; and a surfactant. The formulated resin composition has a hydroxyl content of at least 400 mg KOH/g and a polyurethane foam produced utilizing the formulated resin composition has a closed cell content of at least 90 percent.

The formulated resin composition exhibits a zero ozone depleting potential and produces a polyurethane foam that cures faster than conventional sprayed polyurethane foams.

DETAILED DESCRIPTION OF THE PREFERRED EMBODIMENT

A "froth foaming mixture" is produced by a combination of a formulated isocyanate-reactive polyol stream containing a hydrofluorocarbon blowing agent with an organic polyisocyanate stream where the hydrofluorocarbon blowing agent sufficiently and spontaneously vaporizes when the two combined streams are exposed to atmospheric pressure upon discharge from a dispensing head to produce a froth. Thus, the hydrofluorocarbon acts as a frothing agent. It is to be understood that not all of the hydrofluorocarbon blowing agent needs to vaporize instantaneously from the two stream mixture when discharged, but at least an amount sufficient to produce a froth upon discharge from the dispensing head onto a substrate.

These mixtures are used to form both rigid and closed cell foams. The term a rigid foam is meant to describe a foam having a high ratio of compressive strength to tensile strength of 0.5:1 or greater and an elongation of 10 percent or less. The term a closed cell foam is meant to describe a foam having at least 85 percent closed cells and preferably 90 percent or more closed cells. The foams are polyisocyanate based meaning that they are made by reacting the isocyanate-reactive ingredients in a resin composition with an organic isocyanate or polyisocyanate. In preferred embodiments, all of the hydrofluorocarbon used as a frothing agent is added to the resin composition to form a formulated resin composition.

The formulated resin composition comprises a Mannich polyol, at least one additional polyol, a hydrofluorocarbon blowing agent, a polyurethane linkage promoting catalyst system, a surfactant, and, optionally, flame retardants, fillers, stabilizers, fungicides, pigments or dyes and bacteriostats.

A Mannich polyol is made by alkoxylating a Mannich compound, which is the condensation product of phenol or a substituted phenol, formaldehyde, and an alkanoamine, such as diethanol amine.

For example, the Mannich reaction is conducted by premixing the phenolic compound with a desired amount of the ethanolamine and then slowly adding formaldehyde to the mixture at a temperature below the temperature of Novolak formation. At the end of the reaction, water is stripped from the reaction mixture to provide a crude Mannich reaction product.

The Mannich reaction product is then alkoxylated with an alkylene oxide such as, for example, propylene oxide, ethylene oxide, or a mixture of propylene oxide and ethylene oxide. The alkylene oxide may suitably comprise from 100% to about 80% propylene oxide and from 0 to about 20 wt. % ethylene oxide. Alkoxylation of Mannich reaction products is described in U.S. Pat. Nos. 3,297,597 and 4,137,265, the disclosures of which are herein incorporated by reference.

The alkoxylation with propylene oxide is carried out by introducing the propylene oxide, preferably under pressure, into a vessel containing the Mannich reaction product. No added catalyst is needed since the basic nitrogen in this product provides sufficient catalytic activity to promote the reaction. Reaction temperatures between about 30° C. and about 200° C. may be employed, but the preferred reaction temperatures are in the range of from about 90° to 120° C. Under these conditions the phenolic hydroxyl group and the alkanolamino hydroxyls are reactive to form hydroxypropyl groups. Unreacted and partially reacted materials are removed from the final condensation product in any suitable manner (e.g., by vacuum stripping) to provide clear amber to brown liquids having hydroxyl numbers in the range of 400 to 550 and viscosities between about 4,000 and 45,000 centipoises at 25° C.

In a preferred embodiment of the present invention the Mannich polyol is present in the formulated resin composition at an amount of from 20 to 40 weight percent, based on the total weight of the formulated resin composition.

The formulated resin composition also includes at least one additional polyol compound having at least two isocyanate-reactive hydrogens. The compounds having at least two isocyanate-reactive hydrogens preferably have an average hydroxyl number ranging from 150 to 800 mg KOH/g of compound.

Examples of these polyols include polythioether polyols, polyester amides and polyacetals containing hydroxyl groups, aliphatic polycarbonates containing hydroxyl groups, amine-terminated polyoxyalkylene polyethers, polyester polyols, and polyoxyalkylene polyether polyols. In addition, mixtures of at least two of the aforesaid polyols can be used.

The term "polyester polyol" as used in this specification and claims includes any minor amounts of unreacted polyol remaining after the preparation of the polyester polyol and/or unesterified polyol (e.g., glycol) added after the preparation of the polyester polyol. The polyester polyol can include up to about 40 weight percent free glycol.

Suitable polyester polyols can be produced, for example, from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used individually or in mixtures. Instead of the free dicarboxylic acids, the corresponding dicarboxylic acid derivatives may also be used such as dicarboxylic acid mono- or di-esters of alcohols with 1 to 4 carbons, or dicarboxylic acid anhydrides. Dicarboxylic acid mixtures of succinic acid, glutaric acid and adipic acid in quantity ratios of 20–35:35–50:20–32 parts by weight are preferred, especially adipic acid. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, ethanediol, diethylene glycol, 1,4-butanediol, 1,5-pentanediol, 1,6-hexanediol or mixtures of at least two of these diols are preferred, especially mixtures of 1,4-butanediol, 1,5-pentanediol and 1,6-hexanediol. Furthermore, polyester polyols of lactones, e.g., $\epsilon$-caprolactone or hydroxycarboxylic acids, e.g., $\omega$-hydroxycaproic acid, may also be used.

The polyester polyols can be produced by polycondensation of organic polycarboxylic acids, e.g., aromatic or preferably aliphatic polycarboxylic acids and/or derivatives thereof and multivalent alcohols in the absence of catalysts or preferably in an atmosphere of an inert gas, e.g., nitrogen, carbon dioxide, helium, argon, etc., in the melt at temperatures of 150° to 250° C., preferably 180° to 220° C., optionally under reduced pressure, up to the desired acid value which is preferably less than 10, especially less than 2. In a preferred embodiment, the esterification mixture is subjected to polycondensation at the temperatures mentioned above up to an acid value of 80 to 30, preferably 40 to 30, under normal pressure, and then under a pressure of less than 500 mbar, preferably 50 to 150 mbar. The reaction can be carried out as a batch process or as a continuous process. When present, excess glycol can be distilled from the reaction mixture during and/or after the reaction, such as in the preparation of low free glycol-containing polyester polyols usable in the present invention. Examples of suitable esterification catalysts include iron, cadmium, cobalt, lead, zinc, antimony, magnesium, titanium and tin catalysts in the form of metals, metal oxides or metal salts. However, the polycondensation may also be preformed in liquid phase in the presence of diluents and/or chlorobenzene for aziotropic distillation of the water of condensation.

To produce the polyester polyols, the organic polycarboxylic acids and/or derivatives thereof and multi-valent alcohols are preferably polycondensed in a mole ratio of 1:1–1.8, more preferably 1:1.05–1.2.

After transesterification or esterification, the reaction product can be reacted with an alkylene oxide to form a polyester polyol mixture. This reaction desirably is catalyzed. The temperature of this process should be from about 80° to 170° C., and the pressure should generally range from about 1 to 40 atmospheres.

While the aromatic polyester polyols can be prepared from substantially pure reactant materials, more complex ingredients can be used, such as the side stream, waste or scrap residues from the manufacture of phthalic acid, terephthalic acid, dimethyl terephthalate, polyethylene terephthalate, and the like. Compositions containing phthalic acid residues for use in the invention are (a) ester-containing byproducts from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof. These compositions may be converted by reaction with the polyols of the invention to polyester polyols through conventional transesterification or esterification procedures.

Other materials containing phthalic acid residues are polyalkylene terephthalates, especially polyethylene terephthalate (PET), residues or scraps. Still other residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of byproducts. The desired DMT and the volatile methyl p-toluate byproduct are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process or, if desired, the residue can be processed further as, for example, by distillation, heat treatment and/or methanolysis to recover useful constituents which might otherwise be lost, prior to purging the residue from the system. The residue which is finally purged from the process, either with or without additional processing, is herein called DMT process residue.

Polyoxyalkylene polyether polyols, which can be obtained by known methods, are preferred for use as the additional polyhydroxyl compounds. For example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2-and 2,3-butylene oxide, amylene oxides, styrene oxide, and preferably ethylene oxide and 1,2-propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups.

Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459.

Polyethers which are preferred include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resourcinol glycerol, glycerine, 1,1,1-trimethylol-propane, 1,1,1-trimethylolethane, pentaerythritol, 1,2,6-hexanetriol, a-methyl glucoside, sucrose, and sorbitol. Also included within the term "polyhydric alcohol" are compounds derived from phenol such as 2,2-bis(4-hydroxyphenyl)-propane, commonly known as Bisphenol A.

Particularly preferred additional polyether polyols of the present invention include: Voranol® 370, a sucrose based polyether polyol having a hydroxyl number of approximately 370 and commercially produced by the Dow Chemical Company, Pluracol® 450 and 550 polyether tetrols having hydroxyl numbers of approximately 560 and 450, respectively and commercially produced by BASF Corporation, LHT-240 a polyether triol having a hydroxyl number of approximately 270 and commercially produced by AC West Virginia Polyol Company.

Suitable organic amine initiators which may be condensed with alkylene oxides include aromatic amines such as aniline, N-alkylphenylenediamines, 2,4'-2,2', and 4,4'-methylenedianiline, 2,6- or 2,4-toluenediamine, vicinal toluenediamines, o-chloro-aniline, paminoaniline, 1,5-diaminonaphthalene, methylene dianiline, the various condensation products of aniline and formaldehyde, and the isomeric diaminotoluenes; and aliphatic amines such as mono-, di-, and trialkanolamines, ethylene diamine, propylene diamine, diethylenetriamine, methylamine, ethanolamine, diethanolamine, N-methyl- and N-ethylethanolamine, N-methyl- and N-ethyldiethanolamine, triethanolamine, triisopropanolamine, 1,3-diaminopropane, 1,3-diaminobutane, and 1,4-diaminobutane. Preferable amines include polyoxypropylenediamine, such as Jeffamine® D-230 commercially produced by Huntsman Corporation.

It is to be understood that the polyols initiated by an amine can also be initiated with a polyhydric alcohol, such as when a mixed initiator of an aliphatic amine/-polyhydric alcohol is used like an amine/sucrose package.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine. Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

The closed cell rigid polyisocyanate based foam of the invention is blown with a physically active blowing agent, such as, a $C_1$–$C_4$ hydrofluorocarbon having a boiling point of 300K or less.

Physically active blowing agents are those which boil at the exotherm foaming temperature or less, preferably at 50° C., or less. The most preferred physically active blowing agents are those which have a zero ozone depletion potential. Examples of physically active blowing agents are the volatile non-halogenated hydrocarbons having two to seven carbon atoms such as alkanes, alkenes, cycloalkanes having up to 6 carbon atoms, dialkyl ether, cycloalkylene ethers and ketones; and hydrofluorocarbons (HFCs).

Examples of volatile non-halogenated hydrocarbons include linear or branched alkanes, e.g. butane, isobutane, 2,3-dimethylbutane, n- and isopentane and technical-grade pentane mixtures, n- and isohexanes, n- and isoheptanes, n- and isooctanes, n- and isononanes, n- and isodecanes, n- and isoundecanes, and n- and isodedecanes. Since very good results are achieved with respect to the stability of emulsions, the processing properties of the reaction mixture and the mechanical properties of polyurethane foam products produced when n-pentane, isopentane or n-hexane, or a mixture thereof is used, these alkanes are preferably employed. Furthermore, specific examples of alkenes are 1-pentene, 2-methylbutene, 3-methylbutene, and 1-hexene; of cycloalkanes are cyclobutane, preferably cyclopentane, cyclohexane or mixtures thereof; specific examples of linear or cyclic ethers are dimethyl ether, diethyl ether, methyl ethyl ether, vinyl methyl ether, vinyl ethyl ether, divinyl ether, tetrahydrofuran and furan; and specific examples of ketones are acetone, methyl ethyl ketone and cyclopentanone. Preferentially, cyclopentane, n- and isopentane, n-hexane, and mixtures thereof are employed.

Suitable hydrofluorocarbons include difluoromethane (HFC-32); 1,1,1,2-tetrafluoroethane (HFC-134a); 1,1,2,2-tetrafluoroethane (HFC-134); 1,1-difluoroethane (HFC-152a); 1,2-difluoroethane (HFC-142), trifluoromethane; heptafluoropropane (R-227a); hexafluoropropane (R-136; 1,1,1-trifluoroethane; 1,1,2-trifluoroethane; fluoroethane (R-161); 1,1,1,2,2-pentafluoropropane; pentafluoropropylene (R-2125a); 1,1,1,3-tetrafluoropropane; tetrafluoropropylene (R-2134a); difluoropropylene (R-2152b); 1,1,2,3,3-pentafluoropropane; 1,1,1,3,3-pentafluoro-n-butane; and 1,1,1,3,3-pentafluoropentane (245fa).

In a preferred embodiment, the physically active blowing agent is at least 1,1,1,2-tetrafluoroethane (HFC-134a) and more preferably HFC-134a is the sole physically active blowing agent used because of its wide availability, its zero ozone-depletion potential, and its excellent frothing characteristics.

HFC-134a has a boiling point of 247 K. (−26° C. at 760 mm/Hg) and readily vaporizes at atmospheric pressure to froth a foaming mixture as it exits a dispensing head. The HFC-134a is also known by the abbreviation R-134a. The R-134a may be added to the formulated resin composition at the dispensing head as a separate stream; blended into the formulated resin composition tank immediately prior to dispensing; or it may be pre-blended into the formulated resin composition, stored, and shipped in pressurized containers to a manufacturer of the foams of the present invention. To make a formulated resin composition by any of these methods, R-134a is liquified under pressure, metered into the formulated resin composition, and, optionally, but preferably blended until a homogenous solution is formed. In one embodiment the tanks containing the formulated resin composition are pressurized at 150–300 psig, and depending on the type of dispensing method employed as discussed further below, may also be pre-combined with an inert gas such as nitrogen. In this embodiment, the R-134a is present in an amount of from 7 to 10 weight percent based on the total weight of the formulated resin composition.

In another embodiment, the formulated resin composition is stored in a fifty-gallon drum at atmospheric pressure. The R-134a is present in an amount of from 3 to 6 weight percent based on the total weight of the formulated resin composition.

The amount of R-134a employed will depend upon the desired density of the foam and the limits of its solubility in a particular formulated polyol composition. To reduce costs, it is always advantageous to keep the amount of R-134a to a minimum within the desired density range.

Catalysts may be employed which greatly accelerate the reaction of the compounds containing isocyanate-reactive hydroxyl groups with the modified or unmodified polyisocyanates. Examples of suitable catalysts are cure catalysts which also function to shorten tack time, promote green strength and prevent foam shrinkage. Suitable cure catalysts are organometallic catalysts, preferably organo-lead catalysts, although it is possible to employ metals such as tin, titanium, copper, mercury, cobalt, nickel, iron, vanadium, antimony and manganese. Preferred cure catalysts include lead octoate and lead napthanate.

Tertiary amines also promote urethane linkage formation, and examples include triethylamine,3-methoxypropyl-dimethylamine, triethylenediamine, tributylamine, dimethylcyclohexylamine, dimethylbenzylamine, N-methyl-, N-ethyl- and N-cyclohexylmorpholine, N,N,N',N'-tetramethylethylenediamine, N,N,N',N'-tetramethylbutanediamine or-hexanediamine, N,N,N'-trimethyl isopropyl propylenediamine, pentamethyl-diethylenetriamine, tetramethyldiaminoethylether, bis(-dimethylaminopropyl)urea, dimethylpiperazine, 1-methyl-4-dimethylaminoethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine and dimethylethanolamine.

Tertiary amine ether blow catalysts may also be used. Typical tertiary amine ether blow catalysts include, but are not limited to, N,N,N,N"-tetramethyl-2,2'-diaminodiethyl ether; 2-dimenthyaminoethyl-1,3-dimenthylamineopropyl ether; and N,N-dimorpholinoethyl ether. Most preferred is pentamethyldiethylenetriamine.

The blow catalyst can be used in its pure form or dissolved in a carrier such as a glycol. When a catalyst is employed which is dissolved in a carrier, the amounts stated herein by weight percent refer to the amount of catalyst and do not include the weight of the carrier.

Preferably, the catalyst system of the present invention includes at least one cure catalyst and at least one blow catalyst outlined above, as well as a gelation catalyst, such as triethylenediamine in a dipropylene glycol carrier, which is commercially produced under the trade name Dabco® LV-33 by the Air Products Corporation.

The formulated resin composition preferably also contains a flame retardant. Examples of suitable phosphate flame retarding agents are tricresyl phosphate, tris(2-chloroethyl) phosphate, tris(2-chloropropyl) phosphate, and tris(2,3-dibromopropyl) phosphate. In addition to these halogen-substituted phosphates, it is also possible to use inorganic or organic flame retarding agents, such as red phosphorous, aluminum oxide hydrate, antimony trioxide, arsenic oxide, ammonium polyphosphate (Exolit®) and calcium sulfate, molybdenum trioxide, ammonium molybdate, ammonium phosphate, pentabromodiphenyloxide, 2,3-dibromopropanol, hexabromocyclododecane, dibromoethyldibromocyclohexane, expandable graphite or cyanuric acid derivatives, e.g., melamine, or mixtures of two or more flame retarding agents, e.g., ammonium polyphosphates and melamine, and, if desired, corn starch, or ammonium polyphosphate, melamine, and expandable graphite and/or, if desired, aromatic polyesters, in order to flame retard the polyisocyanate polyaddition products. In general, from 2 to 40 percent, preferably from 5 to 20 percent, of said flame retarding agents may be used, based on the weight of the formulated resin composition.

Examples of suitable surfactants that may be used are compounds which serve to support homogenization of the starting materials and may also regulate the cell structure of the foams. Specific examples are salts of sulfonic acids, e.g., alkali metal salts or ammonium salts of fatty acids such as oleic or stearic acid, of dodecylbenzene- or dinaphthyl-methanedisulfonic acid, and ricinoleic acid; foam stabilizers, such as siloxaneoxyalkylene copolymers and other organopolysiloxanes, oxyethylated alkyl-phenols, oxyethylated fatty alcohols, pariffin oils, castor oil esters, ricinoleic acid esters, Turkey red oil and groundnut oil, and cell regulators, such as paraffins, fatty alcohols, and dimethylpolysiloxanes. The surfactants are usually used in amounts of 0.01 to 5% based on the weight of the formulated resin composition. A particularly preferred non-silicone surfactant is LK-443 commercially produced by Air Products Corporation.

The organic polyisocyanates that may be used in the present invention include all essentially known aliphatic, cycloaliphatic, araliphatic and preferably aromatic multivalent isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures 4,4',2,2'- and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'- and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 32 to 21 weight percent, based on the total weight, e.g., with low molecular weight diols, triols, dialkylene glycols, trialkylene glycols, or polyoxyalkylene glycols with a molecular weight of up to 1500; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 32 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, mixtures of 4,4'- and 2,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethant-4,4'-diisocyanate; the triisocyanates such as 4,4',4"-triphenylmethane triisocyanate, and toluene 2,4,6-trisocyanate; and the tetraisocyanates such as 4,4'-dimethldiphenylmethane-2,2',5,5'-tetraisocyanate and polymeric polyisocyanates such as polymethylene polyphenylene polyisocyanate, and mixtures thereof. Especially useful due to their availability and properties are 4,4'-diphenylmethane diisocyanate, polymethylene polyphenylene polyisocyanate, or mixtures thereof for rigid foams, or a mixture of the foregoing with toluene diisocyanates for semi-rigid foams.

Crude polyisocyanates may also be used in the compositions of the present invention, such as crude toluene diisocyanate obtained by the phosgenation of a mixture of toluenediamines or crude diphenylmethane isocyanate obtained by the phosgenation of crude isocyanates as disclosed in U.S. Pat. No. 3,215,652.

In a first embodiment, the foaming apparatus comprises at least one reactant supply tank for imposing gas pressure to drive the reactants from the supply tanks and a fixed ratio positive displacement pump, specifically designed for the spray application of rigid polyurethane cellular foams.

The organic isocyanate reactant or an organic isocyanate-terminated quasi-prepolymer or prepolymer may be supplied in bulk, totes, drums or supply tanks.

Any means for imposing pressure to drive the reactants from the supply tanks may be used. Typically, a pressurized gaseous inert propellant, such as a nitrogen tank, is used having valved outlets communicating via suitable conduits with the inlets to the supply tanks. The supply tanks are kept under pressure to provide the driving force needed to propel the reactants from the supply tanks and to liquefy the R-134a blowing agent in the formulated resin compositions supply tank(s). The pressure in the supply tanks is generally 150–300 psig.

It is generally necessary, for the proper functioning of the foaming apparatus, that the viscosity of the contents of each of the supply tanks be no greater than about 1200 cps at 78° F. And more preferably no more than about 800 cps. This, of course, means that the materials in each tank may have to be properly selected or formulated, as the case may be, in order to meet this viscosity requirement. The viscosity values mentioned herein are measured at 78° F. and at 80 psig. The viscosity of supply tanks contents are measured under a pressure of 80 psig because of the presence of R-134a in liquid form.

By using a fixed ratio, positive displacement pump, specifically designed for the spray application of rigid polyurethane cellular foams, the volume ratio of the isocyanate stream and the formulated resin composition stream can be held at 1:1.

In a second embodiment, the foaming apparatus comprises a first product drum containing the formulated resin composition and a second drum containing the polyisocyanate component. The liquids are supplied to a spray dispensing head via transfer pumps. The volume ratio of the isocyanate stream and the formulated resin composition stream is held at 1:1.

The following examples are intended to illustrate, but in no way limit, the scope of the present invention. The foaming apparatuses used in this example comprised: (a) a first supply tank for supplying the isocyanate reactant, (b) a second supply tank for supplying the formulated resin composition, (c) a nitrogen pressure tank having a valved outlet in communication, via a distributing valve, with the inlets to the two supply tanks, and (d) a fixed ratio positive displacement pump designed for the spray application of rigid polyurethane foam for a first embodiment; and (a) a first drum for supplying the isocyanate reactant, (b) a second drum for supplying the formulated resin composition, (c) transfers pumps for supplying the components to a spray dispensing head.

The polyols employed in the working examples are defined as follows:

Polyol A is an aromatic, amino, Mannich polyol which is commercially available from Huntsman with a nominal hydroxyl number of approximately 470.

Polyol B is polyether tetrol under the name Pluracol® 450 commercially available from BASF with a nominal hydroxyl number of 540–570.

Polyol C polyether tetrol under the name Pluracol® 550 commercially available from BASF with a nominal hydroxyl number of 435–465.

Polyol D is a sucrose based polyether polyol under the name of Voranol® 370 commercially available from Dow Chemical with a nominal hydroxyl number of 370.

Polyol E is a polyether triol under the name LHT-240 commercially available from AC West Virginia Polyol with a nominal hydroxyl number of 270.

PCF is trichloropropylphosphate, a flame retardant. available from Great Lakes Chemical.

Fyrol 6 is a flame retardant available from Great Lakes Chemical.

Lead is a Lead octoate catalyst.

LK-443 is a non-silicone surfactant commercially available from Air Products.

D-33LV is triethylenediamine in dipropylene glycol, commercially available from Air Products.

D-230 is polyoxypropylenediamine commercially available from Huntsman.

PC-5 is Polycat® 5 a tertiary amine catalyst commercially available from Air Products.

R-134a is 1,1,1,2-tetrafluoroethane, a hydrofluorocarbon blowing agent.

EXAMPLE 1

The first foaming apparatus referred to above is employed to prepare a sprayed froth, rigid, polyurethane foam using the procedure and ingredients described herein. The foaming ingredients are supplied from two cylindrical metal tanks. One supply tank contains the isocyanate component, in this example polyphenylpolyisocyanate. This material is commercially available under the trademark AUTOFROTH® 9300A, a product of BASF Corporation, and has a viscosity at 25° C. of 200 cps. The other supply tank contains the ingredients listed in Table 1 in the indicated relative proportions as weight percent.

TABLE 1

| INGREDIENTS | SAMPLE 1 | SAMPLE 2 |
| --- | --- | --- |
| Polyol A | 30.3 | 30.0 |
| Polyol B | 0.0 | 15.3 |
| Polyol C | 10.0 | 0.0 |
| Polyol D | 15.0 | 0.0 |
| Polyol E | 10.0 | 27.6 |
| Water | 2.0 | 1.2 |
| Lead | 0.5 | 0.6 |
| Fyrol PCF | 10.0 | 6.6 |
| Fyrol 6 | 7.0 | 5.0 |
| LV-33 | 2.0 | 2.0 |
| LK-443 | 0.7 | 0.7 |
| PC-5 | 1.0 | 1.0 |
| D-230 | 2.0 | 2.0 |
| R-134a | 9.5 | 8.0 |

Both of the two supply tanks are placed horizontally on a drum roller and rotated continuously for two hours at an approximate rate of 35 revolutions per minute. After the rotation is stopped, the inlets to the two supply tanks are connected to the nitrogen pressure and the pressure is increased to 200 psig. The outlets from each tank are connected, via separate conduits, to a fixed ratio positive displacement pump designed for the spray application of rigid polyurethane cellular foam. The foam forming ingredients are expelled, by means of the nitrogen head pressure from their respective tanks, to the fixed ratio positive displacement pump, where they are heated to 90° F., pressurized to 1000 psi and sprayed onto cardboard sheets. The results are reported below in Table 2.

TABLE 2

| PROPERTIES | SAMPLE 1 | SAMPLE 2 |
| --- | --- | --- |
| Core Density no knit lines (pounds per cubic foot) | 2.67 | 2.52 |
| Core Density one knit line (pounds per cubic foot) | 3.97 | 3.71 |
| Compressive Strength one inch pass (pounds per square inch) | 32 | — |
| Compressive Strength two inch pass (pounds per square inch) | 60 | 48.5 |

EXAMPLE 2

The following tables denote the ingredients of the formulated resin composition utilizing the second embodiment of the foaming apparatus. As with the previous tables all of the numbers are based on the total weight percent of the formulated resin composition.

TABLE 3

| INGREDIENTS | SAMPLE 1 | SAMPLE 2 |
| --- | --- | --- |
| Polyol A | 27.4 | 37.2 |
| Polyol B | 0.0 | 15.0 |
| Polyol C | 18.0 | 0.0 |
| Polyol D | 18.0 | 0.0 |
| Polyol E | 10.0 | 15.0 |
| Water | 1.8 | 1.5 |
| Lead | 0.4 | 0.6 |
| Fyrol PCF | 10.0 | 10.0 |
| Fyrol 6 | 5.0 | 10.0 |
| LV-33 | 1.5 | 2.0 |
| LK-443 | 0.7 | 0.7 |
| PC-5 | 1.0 | 1.0 |
| D-230 | 1.7 | 2.0 |
| R-134a | 4.5 | 5.0 |

TABLE 4

| PROPERTIES | SAMPLE 1 | SAMPLE 2 |
| --- | --- | --- |
| Core Density no knit lines (pounds per cubic foot) | 3.07 | — |
| Core Density one knit line (pounds per cubic foot) | 4.21 | 3.54 |
| Compressive Strength (pounds per square inch) | 67 | 56 |

What is claimed is:

1. A formulated resin composition for use in a polyurethane froth spraying system comprising:
    a) a blowing agent selected from the group consisting of volatile non-halogenated $C_2$ to $C_7$ hydrocarbons, hydrofluorocarbons, and mixtures thereof, said blowing agent being a liquid at room temperature under pressure;
    b) a Mannich polyol having a viscosity of at least 4,000 centipoise at 25° C.;
    c) at least one additional polyol other than a Mannich polyol;
    d) a catalyst system; and
    e) a surfactant, and optionally, water;
said formulated resin composition having no other blowing agents and a hydroxyl content of at least 400 mg KOH/g.

2. The formulated resin composition of claim 1, wherein said hydrofluorocarbon blowing agent comprises HFC 134a.

3. The formulated resin composition of claim 2, wherein said hydrofluorocarbon blowing agent is present in an amount of from 3 to 10 weight percent based on the total weight of the formulated resin composition.

4. The formulated resin composition of claim 1, wherein said Mannich polyol comprises an aromatic, amino polyol having a hydroxyl content of at least 460 mg KOH/g.

5. The formulated polyol composition of claim 4, wherein said Mannich polyol comprises an aromatic, amino polyol having an amino content of at least 2.8 meq/g.

6. The formulated resin composition of claim 4, wherein said Mannich polyol is present in an amount of from 20 to 40 weight percent based on the total weight of the formulated resin composition.

7. The formulated resin composition of claim 1, wherein said at least one additional polyol comprises a sucrose-initiated polyether polyol.

8. The formulated resin composition of claim 7, wherein said sucrose-initiated polyether polyol is present in an amount of from a positive amount to 20 weight percent based on the total weight of the formulated resin composition.

9. The formulated resin composition of claim 1, wherein said at least one additional polyol comprises a polyether tetrol.

10. The formulated resin composition of claim 9, wherein said polyether tetrol is present in an amount of from a positive amount to 20 weight percent based on the total weight of the formulated resin composition.

11. The formulated resin composition of claim 1, wherein said at least one additional polyol comprises a polyether triol.

12. The formulated resin composition of claim 11, wherein said polyether triol is present in an amount of from a positive amount to 30 weight percent based on the total weight of the formulated resin composition.

13. The formulated resin composition of claim 1, wherein said catalyst system comprises a curing catalyst, a blow catalyst, and a gelation catalyst.

14. The formulated resin composition of claim 13, wherein said curing catalyst comprises lead octanoate present in an amount of from 0.3 to 0.9 weight percent based on the total weight of the formulated resin composition.

15. The formulated resin composition of claim 13, wherein said blow catalyst comprises either pentamethyldiethylenetriamine or polyoxypropylenediamine and the blow catalyst is present in an amount of from 0.01 to 3.0 weight percent based on the total weight of the formulated resin composition.

16. The formulated resin composition of claim 13, wherein said gelation catalyst comprises triethylenediamine in a dipropylene glycol carrier present in an amount of from 0.01 to 3.0 weight percent based on the total weight of the formulated resin composition.

17. The formulated resin composition of claim 1, wherein said surfactant comprises a non-silicone surfactant present in an amount of from 0.01 to 5.0 weight percent based on the total weight of the formulated resin composition.

18. A method for forming a polyurethane foam having a closed cell content of at least 90 percent, comprising the steps of:

a). providing a formulated resin composition having a hydroxyl content of at least 400 mg KOH/g comprising a blowing agent selected from the group consisting of volatile non-halogenated $C_2$ to $C_7$ hydrocarbons, hydrofluorocarbons, and mixtures thereof, said blowing agent being a liquid at room temperature under pressure, a Mannich polyol having a viscosity of at least 4,000 centipoise at 25° C., at least one additional polyol other than a Mannich polyol, a catalyst system, optionally water, and a surfactant;

b) combining the formulated resin composition in the absence of other blowing agents with a polyisocyanate to form a combined mixture; and c) discharging the combined mixture from a dispensing head to form a foam having a closed cell content of at least 90 percent.

19. The method of claim 18, wherein step a) comprises providing HFC 134a as the hydrofluorocarbon blowing agent.

20. The method of claim 18, wherein step a) comprises providing the hydrofluorocarbon blowing agent in an amount of from 3 to 10 weight percent based on the total weight of the formulated resin composition.

21. The method of claim 18, wherein step a) comprises providing a Mannich polyol comprising an aromatic, amino polyol having a hydroxyl content of at least 460 mg KOH/g.

22. The method of claim 21, wherein step a) comprises providing a Mannich polyol comprising an aromatic, amino polyol having an amino content of at least 2.8 meq/g.

23. The method of claim 21, wherein step a) comprises providing the Mannich polyol in an amount of from 20 to 40 weight percent based on the total weight of the formulated resin composition.

24. The method of claim 18, wherein step a) comprises providing a sucrose-initiated polyether polyol as the at least one additional polyol.

25. The method of claim 24, comprising providing the sucrose-initiated polyether polyol in an amount of from a positive amount to 20 weight percent based on the total weight of the formulated resin composition.

26. The method of claim 18, wherein step a) comprises providing a polyether tetrol as the at least one additional polyol.

27. The method of claim 26, wherein step a) comprises providing the polyether tetrol in an amount of from a positive amount to 20 weight percent based on the total weight of the formulated resin composition.

28. The method of claim 18, wherein step a) comprises providing a polyether triol as the at least one additional polyol.

29. The method of claim 28, wherein step a) comprises providing the polyether triol in an amount of from a positive amount to 30 weight percent based on the total weight of the formulated resin composition.

* * * * *